J. S. PIPER.
DEVICE FOR MEASURING ELECTRICAL ENERGY.
APPLICATION FILED JUNE 12, 1914.

1,242,472.

Patented Oct. 9, 1917.
2 SHEETS—SHEET 1.

WITNESSES:
James G. Bethell.
Arthur Trezise, Jr.

John S. Piper
INVENTOR

BY
L. H. Campbell
ATTORNEY

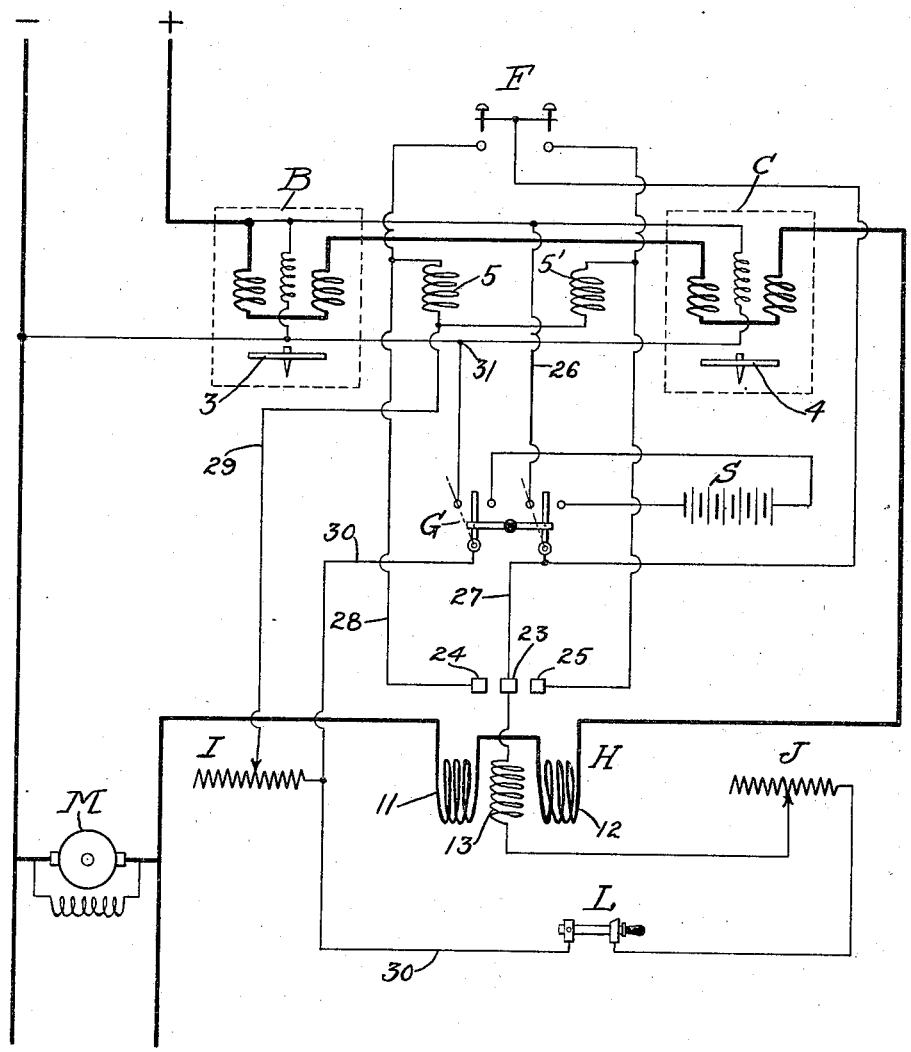

UNITED STATES PATENT OFFICE.

JOHN S. PIPER, OF YONKERS, NEW YORK, ASSIGNOR TO OTIS ELEVATOR COMPANY, OF JERSEY CITY, NEW JERSEY, A CORPORATION OF NEW JERSEY.

DEVICE FOR MEASURING ELECTRICAL ENERGY.

1,242,472. Specification of Letters Patent. Patented Oct. 9, 1917.

Application filed June 12, 1914. Serial No. 844,642.

*To all whom it may concern:*

Be it known that I, JOHN S. PIPER, a citizen of the United States, residing in Yonkers, in the county of Westchester and State of New York, have invented a new and useful Improvement in Devices for Measuring Electrical Energy, of which the following is a specification.

My invention relates in general to devices for measuring electrical energy or power, and has for an object the provision of means for measuring the power taken by electrical apparatus during any period of time, separately from the power delivered by this apparatus during the same period of time.

My invention is particularly adapted to measure the electrical power taken by an electric motor connected to a load, such for example as an electric elevator or hoist.

Broadly speaking, the invention consists in connecting two watt-hour meters of the electromotor or other type in series with each other and with the load, in such manner that when one meter is running in the proper direction to measure the electrical energy or power consumed by the load, the other meter will tend to run backward. On the other hand if the load ceases to be a load and delivers electrical energy or power back into the line, the first meter will tend to run backward while the other meter will run in the proper direction and will measure the power delivered by the load. In order to prevent either of the meters from running or measuring backward, I provide automatically controlled stop mechanism which operates in accordance with the direction of flow of electric current and in this manner one meter will measure the power taken from the line while the other meter will measure the power returned to the line and thus it becomes possible to determine at a glance the actual power consumed by the load expressed in watt-hours, or other measure of electrical energy.

Figure 1:
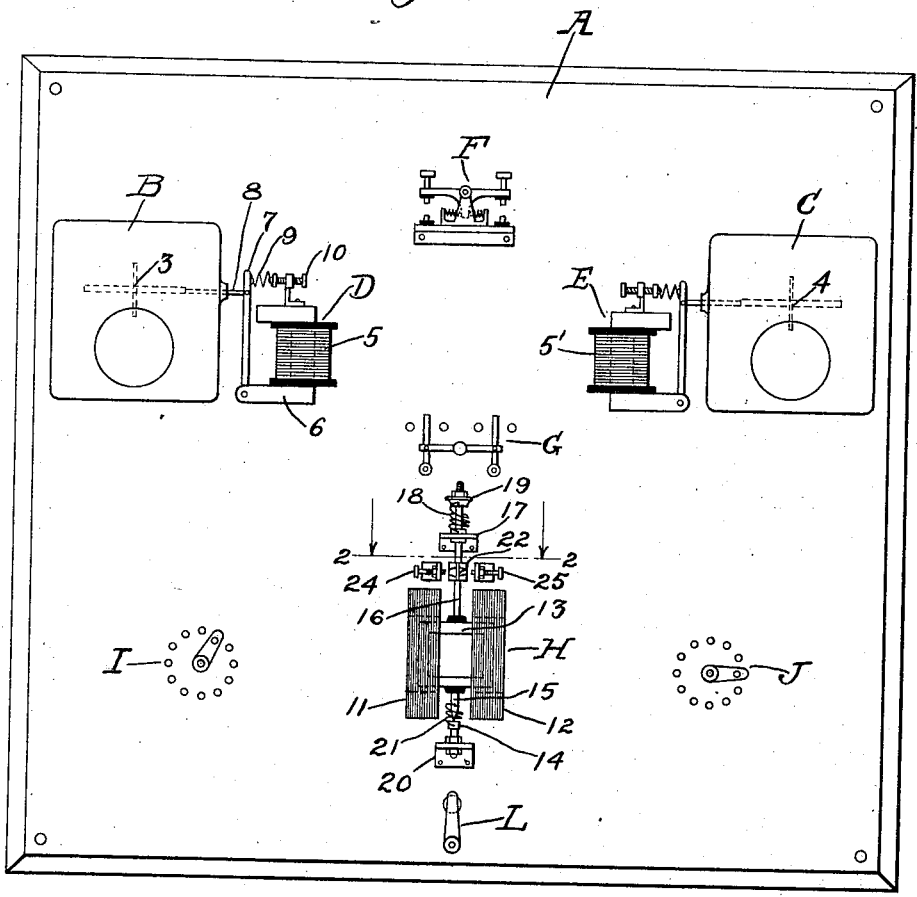
Figure 2:
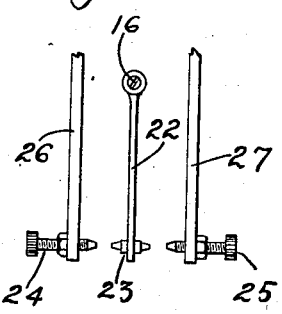

One method of carrying out the purpose of my invention is illustrated in the accompanying drawings in which, Figure 1 represents the various parts of the device mounted upon a suitable support; Fig. 2 is a fragmentary sectional plan view of the selective device, the section being taken on the line 2—2; Fig. 3 is a wiring diagram showing the electrical circuits.

Like reference characters denote similar parts in all of the figures.

Referring to Fig. 1, it will be seen that the present embodiment of my invention comprises two watt-hour meters B and C of the electromotor type having the usual rotating disks 3 and 4, respectively. Associated with each of the meters B and C is an electromagnetic stop device D and E, which co-acts with rotating disks 3 and 4, respectively. H designates the selective device which operates through the stop devices D and E to prevent the meters from running backward. I and J represent resistance controlling rheostats, while L is a switch in a circuit of the selective device H. A 4-point switch G is used to connect some of the parts of the device to any one of a plurality of sources of electric current, while an auxiliary switch F is arranged to operate the stop devices D and E by hand. All of the parts of the device are preferably mounted on a controller board A of slate or wood or other suitable insulating material.

The two meters B and C may be of the electromotor or electro-chemical type, but for practical reasons the former type of meter is shown as being the more desirable. A rotating element of each of these meters such as the disks 3 and 4, is controlled by a corresponding stop device D and E, respectively. Each of the stop devices comprises a magnet 5 carried on a core 6 to which is pivoted an armature 7. To the latter is pivoted a stop-pin or rod 8 extending through the casing of a meter and normally bearing against the meter disk 3 under the influence of a spring 9, whose tension may be varied at will by means of a screw 10.

The selective device H comprises two stationary windings 11 and 12, and a third winding 13 which lies within the magnetic field set up by the stationary windings 11 and 12 and is adapted to swing or rotate therein through a limited angle and thereby carry the contact 23 (see Fig. 2) into electrical engagement with either of the contacts 24 and 25, depending upon the direction of current flow in the series coils 11 and 12. The winding 13 may be carried by a metal frame of very light construction after the manner of all electrical instruments of a similar nature, and the frame is carried by two shafts 15 and 16, which are insulated from each other and in vertical alinement. The shaft 15 rests in a step bearing 14, while the shaft 16 is carried in a bearing 17. A helical spring 18 is secured to the bearing 17 and to a nut 19 carried by the shaft 16. The purpose of this spring is to maintain the winding 13 in an intermediate position when the latter is deënergized and does not exert any torque. Current may be led to the winding 13 by way of the shafts 14 and 15, and the bearing supports 20 and 17, respectively. A small spring 21 serves to carry current from the shaft 15 to the bearing 20 without the current having to pass through the step bearing 14. To the shaft 16 is secured a pointer 22 carrying a contact 23 (see Fig. 2) which is adapted to contact with one or the other of two stationary contacts 24 and 25, supported by the members 26 and 27, respectively. The construction of the other parts of the apparatus is self-evident, so a detail description of the same is unnecessary.

The arrangement of electrical circuits is clearly shown in Fig. 3, in which it will be seen that the series coils of the meters B and C are connected in series with each other and in series with the windings 11 and 12 of the selective device H. This series circuit is completed to the — main through a load M which may be of any character capable of producing a counter-electro-motive force and which is here shown as a direct current electric motor. The shunt coils of the meters B and C are connected in parallel across the mains as is customary.

The coil 13 of the selective device H is adapted to receive current always flowing in the same direction, and the source of current for the coil as well as for the coils 5 and 5′ of the stop devices D and E, respectively, may be taken from the main line or from any other suitable source of electric energy, such for example as the battery S. The switch G is for the purpose of closing the desired circuit to these coils.

The operation of the device is very simple and may be described as follows: Assuming the switch G is moved to the left into the dotted line position, a circuit may be traced from the + main, through the wire 26, switch G, wire 27, coil 13 of the selective device H, rheostat J, switch L, wire 30, switch G, and by wire 31 to the — main. The coil 13 is now energized and will swing to the right or left in accordance with the direction of current flow in the windings 11 and 12. If the load M be taking current from the line, the coil 13 will swing the contact 23 into electrical engagement with the contact 24 thereby closing a circuit to the stop device winding 5. This circuit may be traced from the + main, through the conductor 26, switch G, wire 27, contacts 23 and 24, wire 28, winding 5, wire 29, rheostat I, wire 30, switch G, and by the wire 31 to the — main. The energization of the winding 5 causes the stop pin 8 (see Fig. 1) to be withdrawn from contact with the disk 3 of meter B and the latter is free to measure the energy being taken by the load M. The meter C at this time tends to run backward but is prevented from doing so by reason of the stop device E, the magnet of which is open-circuited at the contact 25 of the selective device H.

In case the load device M should develop a counter-electro-motive force in excess of the line voltage, such as would take place were the load device M a motor and the same were overhauled or driven by the load as a generator, the current through the windings 11 and 12 of the selective device H and the series windings of the meters B and C would be reversed in direction and the meter B would tend to run backward. Before this can happen, the coil 13 of the selective device immediately swings to the right and in so doing opens the circuit to the stop device D and closes a circuit to the stop device E at the contacts 24 and 25, respectively. The stop device D immediately stops the meter B from registering further, while the stop device E becomes energized and releases the disk 4 of meter C. The latter may now start to rotate in the proper direction and the meter C will correctly measure the energy being returned to the line. If the load conditions should again change, so that the load device M takes current from the line, the reversal of current flow in the series windings of the selective device will cause the latter again to energize the stop device D and deënergize the stop device E so that the meter B may operate in the proper direction, while the meter C is prevented from rotating backward. Thus it is seen that the device is entirely automatic in its operation and requires no attention whatsoever after the connections are once made. One meter, the meter B, will measure and record the energy or power taken from the line by the load, while the other meter, the meter C, will measure and record the energy or power returned to the line, and, by noting the difference between these two readings, the actual energy consumed is immediately and accurately determined.

In case one desires to manipulate the device by hand, as a preliminary test or for any other purpose, the switch device F may be used, this switch doing manually just what the selective device H does automatically, they being connected in parallel circuits. By opening the switch L, the coil 13 becomes deënergized and the contact 23 of the selective device assumes a position intermediate the stationary contacts 24 and 25, so that both meters are held against operation. The rheostats I and J supply a ready means for varying the current in the windings of the stop devices D and E, and the coil 13, respectively, so that these devices may operate to the best advantage. The meters B and C as before pointed out, may be of the electro-motor or electro-chemical type, and where the latter type of meter is used, the stop devices D and E may be provided with contacts arranged to open-circuit the cells, or the contacts on the stop devices could be arranged to short circuit or otherwise control a winding of the electro-motor type of meter thus doing away with the mechanical stop effected by the stop-pin 8. The meters B and C may be arranged for either direct or alternating current of any phase, the principle of operation being the same in every instance. The load device M may be one or several electric motors, or in fact any device which is capable of producing a counter-electro-motive force. The device of the invention may also be used in connection with a storage battery, wherein it is desired to measure separately the charge and discharge throughout any desired period of time. Numerous other examples could be given wherein the device might be used to great advantage, but such examples will readily occur to one skilled in the art, and hence need not be given here.

While the disclosure of my invention herein given shows a preferred form, it is obvious that various changes and alterations could readily be made by one skilled in the art without departing from the spirit and scope of my invention, hence I desire not to be limited to the precise arrangement and construction of parts herein disclosed.

What I claim is:—

1. The combination with an electric circuit in which the direction of current flow is reversed, of a meter for measuring the flow of energy in one direction, another meter for measuring the flow of energy in a reverse direction, both meters being permanently connected in the circuit, and a stop device co-acting with a moving element of each meter for preventing the operation of the same except the flow of energy therethrough be in the proper direction.

2. In combination two meters of the electro-motor type adapted to be connected in an electric circuit and arranged simultaneously to run in a forward and backward direction, respectively, a stop member associated with each meter and adapted normally to interfere with the operation of both meters, and electromagnetic means responsive to the direction of current flow in said circuit for controlling said members.

3. In combination two meters of the electro-motor type adapted to be connected in an electric circuit and arranged simultaneously to run in a forward and backward direction, respectively, a stop member associated with each meter and adapted normally to interfere with the operation of both meters, a separate electromagnet controlling each of said stop members, and means for energizing one or the other of said electromagnets in accordance with the direction of current flow in said circuit.

4. In combination two meters adapted to be connected in series with an electric circuit and in series with a power consuming device, said meters being arranged simultaneously to run forward and backward, respectively, separate means for holding said meters against movement, an electromagnet associated with each of said holding means, and automatic means operating in accordance with the direction of flow of energy in said circuit, for closing a circuit to one of the electromagnets of the holding means and thereby permit the corresponding meter to register.

5. In combination a meter adapted to be connected in a main line circuit and to measure the current flow in one direction only, another meter adapted to be connected in said circuit and to measure the current flow in a reverse direction only, independent stop devices comprising a separate electromagnet associated with each meter and adapted to prevent the meters from registering, an electro-responsive device in said circuit adapted to operate in accordance with the direction of current flow in the circuit, a switch controlled by said electro-responsive device, and a source of current independent of the main line circuit adapted to be connected with said switch and the electromagnets of the stop devices.

6. In combination a meter adapted to be connected in a main line circuit and to measure the current flow in one direction only, another meter adapted to be connected in said circuit and to measure the current flow in a reverse direction only, independent stop devices comprising a separate electromagnet associated with each meter and adapted to prevent the meters from registering, an electro-responsive device in said circuit adapted to operate in accordance with the direction of current flow in the circuit, a switch controlled by said electro-responsive device, and a source of electric current independent of the main line circuit adapted to be connected with said switch, electromagnets, and a magnet winding of said electro-responsive device.

In testimony whereof, I have signed my name to this specification in the presence of two subscribing witnesses.

JOHN S. PIPER.

Witnesses:
WALTER C. STRANG,
ARTHUR TREZISE, Jr.